US012603760B2

(12) United States Patent
Mu et al.

(10) Patent No.: US 12,603,760 B2
(45) Date of Patent: Apr. 14, 2026

(54) METHOD AND APPARATUS FOR GENERATING RANDOM NUMBER IN BLOCKCHAIN

(71) Applicant: Digital Currency Institute, The People's Bank of China, Beijing (CN)

(72) Inventors: Changchun Mu, Beijing (CN); Gang Di, Beijing (CN); Youcai Qian, Beijing (CN); Qingjie Chen, Beijing (CN); Jinzhao Du, Beijing (CN)

(73) Assignee: Digital Currency Institute, The People's Bank of China, Beijing (CN)

( * ) Notice: Subject to any disclaimer, the term of this patent is extended or adjusted under 35 U.S.C. 154(b) by 303 days.

(21) Appl. No.: 18/280,202

(22) PCT Filed: Mar. 3, 2022

(86) PCT No.: PCT/CN2022/079062
§ 371 (c)(1),
(2) Date: Sep. 1, 2023

(87) PCT Pub. No.: WO2022/184137
PCT Pub. Date: Sep. 9, 2022

(65) Prior Publication Data
US 2024/0146509 A1 May 2, 2024

(30) Foreign Application Priority Data

Mar. 3, 2021 (CN) .......................... 202110233212.4
Mar. 3, 2021 (CN) .......................... 202110233267.5

(51) Int. Cl.
*H04L 9/08* (2006.01)
(52) U.S. Cl.
CPC ................................. *H04L 9/0816* (2013.01)

(58) Field of Classification Search
CPC ....... H04L 9/0816; H04L 9/0869; H04L 9/50; H04L 63/123
See application file for complete search history.

(56) References Cited

U.S. PATENT DOCUMENTS

2019/0327084 A1    10/2019  Oh
2020/0007558 A1*    1/2020  Inokuchi ................. H04L 63/20
(Continued)

FOREIGN PATENT DOCUMENTS

CN        109558112  A       4/2019
CN        110135909  A       8/2019
(Continued)

OTHER PUBLICATIONS

Chatterjee Krishnendu et al: "Probabilistic Smart Contracts: Secure H04L9/00 Randomness on the Blockchain", H04L9/08 2019 IEEE International Conference on H04L9/06 Blockchain and Cryptocurrency (ICBC), H04L9/32 IEEE, May 14, 2019.
(Continued)

*Primary Examiner* — Trang T Doan
*Assistant Examiner* — Abdullah Almamun
(74) *Attorney, Agent, or Firm* — The Sun IP Law

(57) ABSTRACT

Provided are a method and apparatus for generating a random number in a blockchain, wherein the method includes: a first random number and a first digest value of the first random number are locally generated by a first node in a blockchain; the first node submits the first digest value to a smart contract; the smart contract broadcasts a first service; the smart contract determines a second node from the at least one blockchain node; when the first service ends, the first node submits the first random number to the smart contract; when the smart contract verifies that the first random number corresponds to the first digest value, the smart contract generates a second random number based on a second digest (Continued)

At least one blockchain node locally generates a first random number and a first digest value of the first random number — S401

The at least one blockchain node respectively submits the first digest value to a smart contract of the blockchain within a first preset duration — S402

The at least one blockchain node submits the first random number to the smart contract within a second preset duration that is started after the first preset duration ends — S403

The smart contract verifies the received at least one first digest value and the first random number corresponding to the first digest value — S404

A second random number is generated based on the successfully verified first random number — S405

A service is started based on the second random number — S406 value of the second node and the first random number; and a second service is started based on the second random number.

19 Claims, 8 Drawing Sheets

(56) References Cited

U.S. PATENT DOCUMENTS

| | | | | |
|---|---|---|---|---|
| 2020/0042999 | A1* | 2/2020 | Zhang | G06Q 20/3825 |
| 2020/0146955 | A1 | 5/2020 | Zhao et al. | |
| 2020/0286339 | A1 | 9/2020 | Peek et al. | |
| 2021/0042741 | A1* | 2/2021 | Lu | G06F 21/602 |
| 2021/0281921 | A1* | 9/2021 | Bhuyan | H04N 21/8456 |
| 2021/0286595 | A1* | 9/2021 | Huang | G06F 16/27 |
| 2021/0314164 | A1* | 10/2021 | Lin | H04L 9/14 |
| 2022/0123947 | A1* | 4/2022 | Dumas | G01R 33/56325 |
| 2023/0125083 | A1* | 4/2023 | Xu | H04L 9/3247 |
| | | | | 713/189 |
| 2023/0208648 | A1* | 6/2023 | De Caro | H04L 9/0869 |
| | | | | 380/46 |
| 2023/0300256 | A1* | 9/2023 | Zhao | H04M 15/51 |
| | | | | 705/400 |

FOREIGN PATENT DOCUMENTS

| | | | | | |
|---|---|---|---|---|---|
| CN | 110430045 | A | | 11/2019 | |
| CN | 110601819 | A | | 12/2019 | |
| CN | 110868286 | A * | 3/2020 | .......... | G06F 21/602 |
| CN | 111223227 | A | | 6/2020 | |
| CN | 111311386 | A | | 6/2020 | |
| CN | 111327427 | A | | 6/2020 | |
| CN | 112910643 | A | | 6/2021 | |
| CN | 112968769 | A | | 6/2021 | |
| WO | 2020146955 | A1 | | 7/2020 | |

OTHER PUBLICATIONS

The first office action of counterpart CN application No. 2021102332124 issued on Aug. 3, 2022.

The second office action of counterpart CN application No. 2021102332124 issued on Feb. 25, 2023.

The search report of counterpart EP application No. 22762599.3 issued on Jan. 31, 2025.

* cited by examiner

Fig. 1

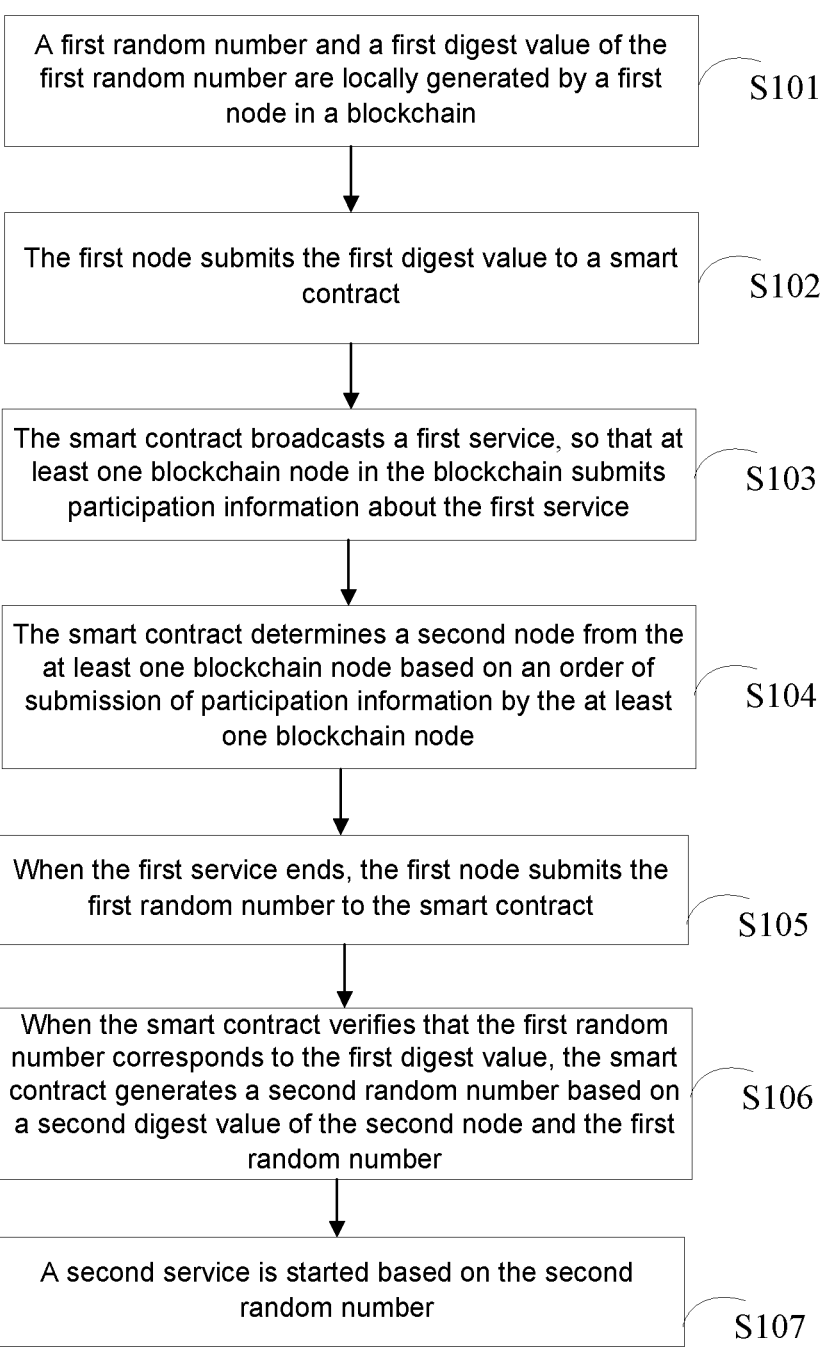

A first random number and a first digest value of the first random number are locally generated by a first node in a blockchain      S101

The first node submits the first digest value to a smart contract      S102

The smart contract broadcasts a first service, so that at least one blockchain node in the blockchain submits participation information about the first service      S103

The smart contract determines a second node from the at least one blockchain node based on an order of submission of participation information by the at least one blockchain node      S104

When the first service ends, the first node submits the first random number to the smart contract      S105

When the smart contract verifies that the first random number corresponds to the first digest value, the smart contract generates a second random number based on a second digest value of the second node and the first random number      S106

A second service is started based on the second random number      S107

Fig. 4

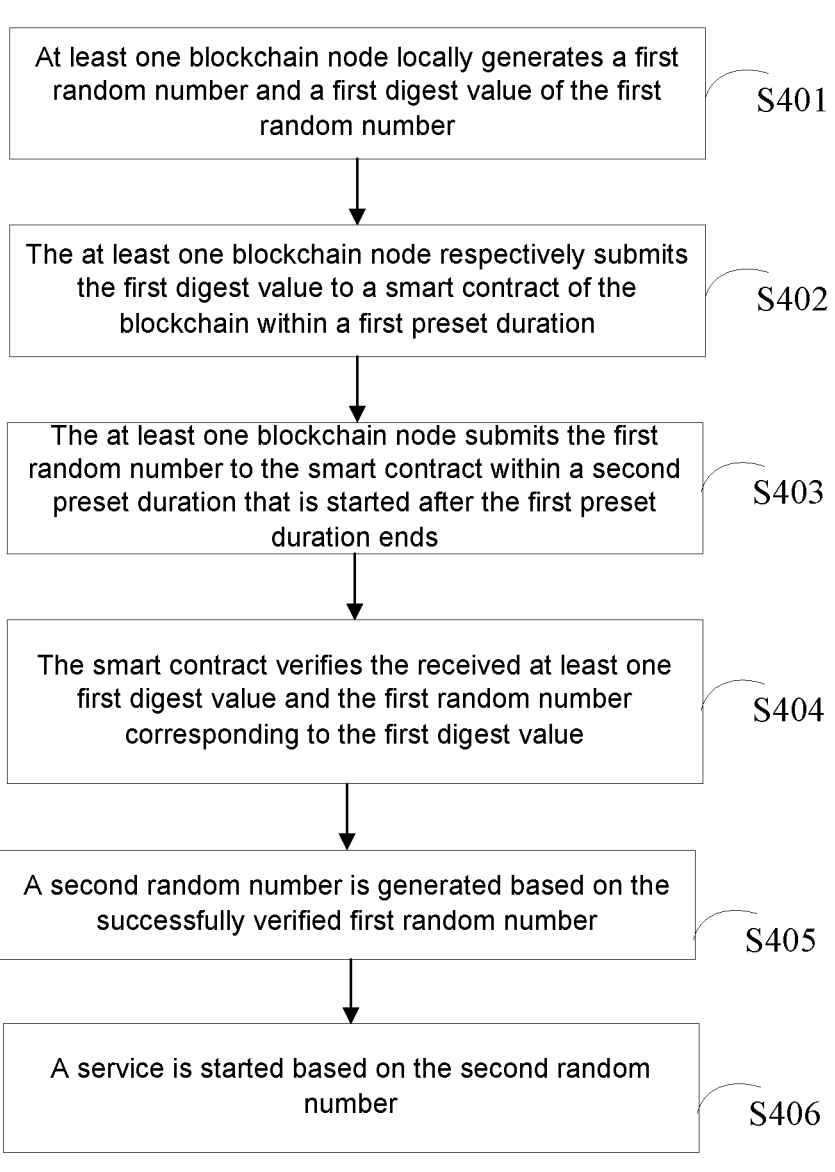

At least one blockchain node locally generates a first random number and a first digest value of the first random number

S401

The at least one blockchain node respectively submits the first digest value to a smart contract of the blockchain within a first preset duration

S402

The at least one blockchain node submits the first random number to the smart contract within a second preset duration that is started after the first preset duration ends

S403

The smart contract verifies the received at least one first digest value and the first random number corresponding to the first digest value

S404

A second random number is generated based on the successfully verified first random number

S405

A service is started based on the second random number

Figure 7:
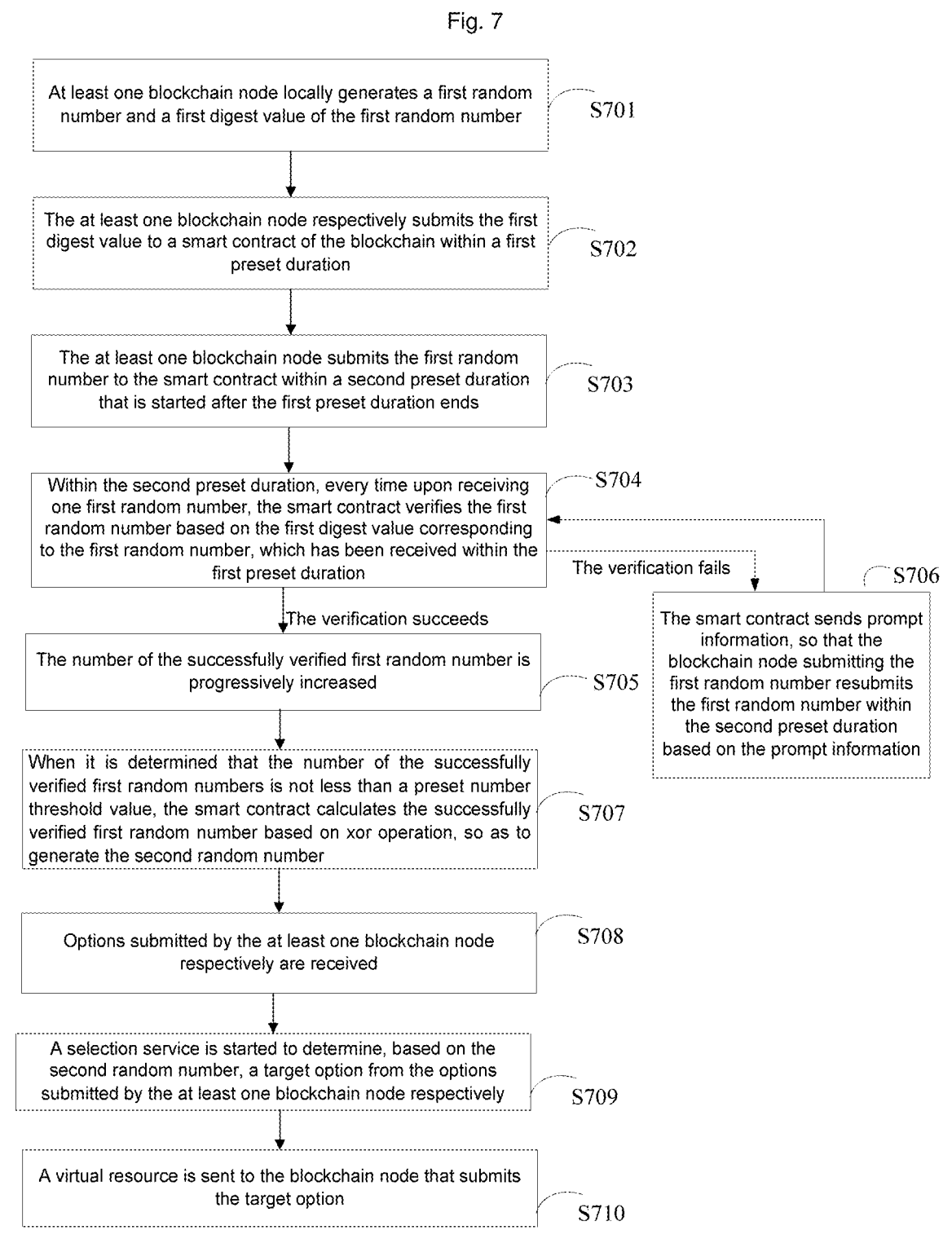

At least one blockchain node locally generates a first random number and a first digest value of the first random number — S701

The at least one blockchain node respectively submits the first digest value to a smart contract of the blockchain within a first preset duration — S702

The at least one blockchain node submits the first random number to the smart contract within a second preset duration that is started after the first preset duration ends — S703

Within the second preset duration, every time upon receiving one first random number, the smart contract verifies the first random number based on the first digest value corresponding to the first random number, which has been received within the first preset duration — S704

The verification fails

The smart contract sends prompt information, so that the blockchain node submitting the first random number resubmits the first random number within the second preset duration based on the prompt information — S706

The verification succeeds

The number of the successfully verified first random number is progressively increased — S705

When it is determined that the number of the successfully verified first random numbers is not less than a preset number threshold value, the smart contract calculates the successfully verified first random number based on xor operation, so as to generate the second random number — S707

Options submitted by the at least one blockchain node respectively are received — S708

A selection service is started to determine, based on the second random number, a target option from the options submitted by the at least one blockchain node respectively — S709

A virtual resource is sent to the blockchain node that submits the target option — S710

_900_

903

902

904

901

905

_1000_

| CPU 1001 | ROM 1002 | RAM 1003 |

1004

I/O interface 1005

| Input portion 1006 | Output portion 1007 | Storage portion 1008 | Communication portion 1009 | Drive 1010 |

Removable medium 1011

METHOD AND APPARATUS FOR GENERATING RANDOM NUMBER IN BLOCKCHAIN

CROSS-REFERENCE TO RELATED APPLICATION

The present disclosure claims the priority of Chinese Patent Application No. 202110233267.5, filed on Mar. 3, 2021 and entitled "Method and Apparatus for Generating Random Number in Blockchain", and claims the priority of Chinese Patent Application No. 202110233212.4, filed on Mar. 3, 2021 and entitled "Method and Apparatus for Generating Random Number in Blockchain", the entire contents of which are referred to herein as a part of the present disclosure.

TECHNICAL FIELD

The present disclosure relates to the technical field of computers, and in particular, to a method and apparatus for generating a random number in a blockchain.

BACKGROUND

A random number has many application scenarios in a blockchain, such as the generation of private keys, guessing applications, and the like. With the continuous development of the blockchain, the application of the random number in the blockchain will continue to increase. Therefore, how to generate a trusted random number in the blockchain is very important for the security of assets in the blockchain and the fairness of the applications.

A random number generation method commonly used in the related art is: a block producer calculates a random number based on that a hash value of one or more blocks in a blockchain is taken as the random number seed of the block producer.

During the process of implementing the present invention, the inventor finds that at least the following problems exist in the related art: the block producer may adjust the random number by adding or abandoning partial transactions, that is, the block producer has a possibility of cheating in a random number generation process, which results in a lower credibility of the generated random number.

SUMMARY

In view of this, an embodiment of the present disclosure provides a method and apparatus for generating a random number in a blockchain. A first node in the blockchain is used to locally generate a first random number and a first digest value of the first random number, and then the first digest value is submitted to a smart contract. After the smart contract broadcasts a first service, each blockchain node may participate in the first service by submitting participation information, and then the smart contract may determine a second node based on the order of the blockchain nodes submitting the participation information, and generate a second random number by combining a second digest value of the second node with the first random number that is submitted by the first node after the first service ends. Since the order of the blockchain nodes participating in the first service cannot be predetermined, that is, the order of the blockchain nodes participating in the first service is random, and then cheating cannot be performed during the process of determining the second node based on the order of the blockchain nodes submitting the participation information, thereby ensuring the randomness of the second node. Moreover, the first digest value submitted by the first node to the smart contract may be notified to each blockchain node in the blockchain, and the smart contract further verifies the first digest value and the first random number, so that cheating cannot be performed on the first digest value submitted by the first node and the first random number submitted after the first service ends. Therefore, cheating cannot be performed during the process when the smart contract generates the second random number based on the second digest value of the second node and the first random number submitted by the first node, that is, cheating cannot be performed during the generation process of the second random number, thereby improving the credibility of the generated random number. Further, a second service is started based on the generated trusted random number, so that the randomness of the result of the second service can be ensured, and the possibility of cheating caused by human intervention is avoided, thereby ensuring the fairness of the service result.

In order to achieve the above objectives, according to one aspect of the embodiment of the present disclosure, a method for generating a random number in a blockchain is provided.

The method for generating the random number in the blockchain according to the embodiment of the present disclosure includes: locally generating, by a first node in the blockchain, a first random number and a first digest value of the first random number;

submitting, by the first node, the first digest value to a smart contract;

broadcasting, by the smart contract, a first service, so that at least one blockchain node in the blockchain submits participation information about the first service;

the smart contract determining a second node from the at least one blockchain node based on the order of submission of participation information by the at least one blockchain node;

when the first service ends, submitting, by the first node, the first random number to the smart contract;

when the smart contract verifies that the first random number corresponds to the first digest value, generating a second random number based on a second digest value of the second node and the first random number; and starting a second service based on the second random number.

As at least one alternative embodiment, determining the second node from the at least one blockchain node includes:

determining the second node based on a preset target value and an order of submission of participation information by the at least one blockchain node.

As at least one alternative embodiment, the preset target value is a last one in the order.

As at least one alternative embodiment, the second digest value and the first random number are calculated based on a preset operation rule, so as to generate the second random number.

As at least one alternative embodiment, the smart contract generates a third digest value based on the first random number, wherein an algorithm for generating the first digest value is the same as an algorithm for generating the third digest value; and when the third digest value is the same as the first digest value, the smart contract determines that the first random number corresponds to the first digest value.

As at least one alternative embodiment, a blockchain node corresponding to a provider of the first service is taken as the first node.

As at least one alternative embodiment, after generating the second random number, the method further includes:

the smart contract sending a virtual resource to the first node.

As at least one alternative embodiment, starting the second service based on the second random number includes:

receiving options submitted by the at least one blockchain node respectively; and starting a selection service to determine, based on the second random number, a target option from the options submitted by the at least one blockchain node respectively.

As at least one alternative embodiment, the method further includes: sending a virtual resource to the blockchain node that submits the target option.

In order to achieve the above objectives, according to yet another aspect of the embodiment of the present disclosure, an apparatus for generating a random number in a blockchain is provided.

The apparatus for generating the random number in the blockchain according to the embodiment of the present disclosure includes: a local generation module, a submission module, a first service module, a random number generation module and a second service module, wherein, the local generation module is configured to locally generate, by a first node in the blockchain, a first random number and a first digest value of the first random number;

the submission module is configured to submit the first digest value to a smart contract by using the first node; and when the first service ends, submit the first random number to the smart contract by using the first node;

the first service module is configured to broadcast a first service by the smart contract, so that at least one blockchain node in the blockchain submits participation information about the first service;

the random number generation module is configured to determine, by the smart contract, a second node from the at least one blockchain node based on an order of submission of participation information by the at least one blockchain node; and when the smart contract verifies that the first random number corresponds to the first digest value, generate a second random number based on a second digest value of the second node and the first random number; and the second service module is configured to start a second service based on the second random number.

As at least one alternative embodiment, the random number generation module is configured to determine the second node based on a preset target value and the order of submission of participation information by the at least one blockchain node.

As at least one alternative embodiment, the preset target value is a last one in the order.

As at least one alternative embodiment, the random number generation module is configured to calculate the second digest value and the first random number based on a preset operation rule, so as to generate the second random number.

As at least one alternative embodiment, the random number generation module is configured to generate, by the smart contract, a third digest value based on the first random number, wherein an algorithm for generating the first digest value is the same as an algorithm for generating the third digest value; and when the third digest value is the same as the first digest value, determine that the first random number corresponds to the first digest value.

As at least one alternative embodiment, the local generation module is configured to taken, as the first node, a blockchain node corresponding to a provider of the first service.

As at least one alternative embodiment, the second service module is further configured to send a virtual resource to the first node by the smart contract.

As at least one alternative embodiment, the second service module is configured to receive options submitted by the at least one blockchain node respectively; and start a selection service to determine, based on the second random number, a target option from the options submitted by the at least one blockchain node respectively.

As at least one alternative embodiment, the second service module is further configured to send a virtual resource to a blockchain node that submits the target option.

In addition, another embodiment of the present disclosure provides a method and apparatus for generating a random number in a blockchain. Each blockchain node in the blockchain locally generates a first random number and a first digest value of the first random number, and then respectively submits the first digest value and the first random number to a smart contract in two stages (a first preset duration and a second preset duration), the smart contract verifies the received first digest value and the corresponding first random number, and generates a second random number based on the successfully verified first random number. Therefore, by means of respectively submitting the first digest value and the first random number to the smart contract in two stages, and verifying the first digest value and the first random number by the smart contract, the possibility of cheating in a random number generation process is avoided, thereby improving the credibility of the random numbers. Furthermore, a service is started based on the generated trusted random number, so that the randomness of a service result can be ensured, the possibility of cheating caused by human intervention is avoided, thereby ensuring the fairness of the service result.

In order to achieve the above objectives, according to another aspect of the embodiment of the present disclosure, a method for generating a random number in a blockchain is provided.

The method for generating the random number in the blockchain according to the embodiment of the present disclosure includes: locally generating, by at least one blockchain node, a first random number and a first digest value of the first random number;

respectively submitting, by the at least one blockchain node, the first digest value to a smart contract of the blockchain within a first preset duration;

submitting, by the at least one blockchain node, the first random number to the smart contract within a second preset duration that is started after the first preset duration ends;

verifying, by the smart contract, the received at least one first digest value and the first random number corresponding to the first digest value;

generating a second random number based on the successfully verified first random number; and starting a service based on the second random number.

As at least one alternative embodiment, when it is determined that the number of the successfully verified first random number is not less than a preset number threshold value, the smart contract generates the second random number based on the successfully verified first random number.

As at least one alternative embodiment, generating the second random number based on the successfully verified first random numbers includes:

calculating the successfully verified first random number based on a preset operation rule, so as to generate the second random number.

As at least one alternative embodiment, generating the second random number based on the successfully verified first random numbers includes:

determining, by the smart contract, from the at least one blockchain node, a blockchain node that submits the first random number at last; and calculating, based on a preset operation rule, a digest value of the blockchain node that submits the first random number at last, and the successfully verified first random number, so as to generate the second random number.

As at least one alternative embodiment, verifying, by the smart contract, the first random number and the corresponding first digest value, if within the second preset duration, every time upon receiving one first random number, the smart contract determines the first digest value corresponding to the first random number has been received, and the first digest value is received within the first preset duration;

if verifying successfully, progressively increasing the number of the successfully verified first random number; and if verifying unsuccessfully, sending prompt information by the smart contract, so that the blockchain node submitting the first random number resubmits the first random number within the second preset duration based on the prompt information.

As at least one alternative embodiment, verifying, by the smart contract, the received at least one first digest value and the first random number corresponding to the first digest value, includes:

for each pair of the first digest value and the first random number, generating, by the smart contract, a second digest value based on the first random number, wherein an algorithm for generating the first digest value is the same as an algorithm for generating the second digest value; and if the second digest value is the same as the first digest value, determining that the first digest value and the corresponding first random number are successfully verified.

As at least one alternative embodiment, the method further includes:

determining, by the smart contract, the blockchain node corresponding to the successfully verified first random number, and sending a virtual resource to the determined blockchain node.

As at least one alternative embodiment, the preset number threshold value is determined based on the number of the at least one blockchain node.

As at least one alternative embodiment, starting the service based on the second random number includes:

receiving options submitted by the at least one blockchain node respectively; and starting a selection service to determine, based on the second random number, a target option from the options submitted by the at least one blockchain node respectively.

As at least one alternative embodiment, the method further includes:

sending a virtual resource to a blockchain node that submits the target option.

In order to achieve the above objectives, according to yet another aspect of the embodiment of the present disclosure, an apparatus for generating a random number in a blockchain is provided.

The apparatus for generating the random number in the blockchain according to the embodiment of the present disclosure includes: a local generation module, a submission module, a random number generation module and a service starting module, wherein, the local generation module is configured to locally generate, by at least one blockchain node, a first random number and a first digest value of the first random number;

the submission module is configured to respectively submit, by the at least one blockchain node, the first digest value to a smart contract of the blockchain within a first preset duration; and submit, by the at least one blockchain node, the first random number to the smart contract within a second preset duration that is started after the first preset duration ends;

the random number generation module is configured to verify, by the smart contract, the received at least one first digest value and the first random number corresponding to the first digest value, and generate a second random number based on a successfully verified first random number; and the service starting module is configured to start a service based on the second random number.

As at least one alternative embodiment, the random number generation module is configured to: when the smart contract determines that the number of the successfully verified first random number is not less than a preset number threshold value, generate the second random number based on the successfully verified first random number.

As at least one alternative embodiment, the random number generation module is configured to calculate the successfully verified first random number based on a preset operation rule, so as to generate the second random number.

As at least one alternative embodiment, the random number generation module is configured to determine, by the smart contract and from the at least one blockchain node, a blockchain node that submits the first random number at last; and calculate, based on a preset operation rule, a digest value of the blockchain node that submits the first random number at last, and the successfully verified first random number, so as to generate the second random number.

As at least one alternative embodiment, the random number generation module is configured to: verify the first random number and the corresponding first digest value, if within the second preset duration, every time upon receiving one first random number, the smart contract determines the first digest value corresponding to the first random number has been received, and the first digest value is received within the first preset duration; if verifying successfully, progressively increase the number of the successfully verified first random number; and if verifying unsuccessfully, send prompt information by the smart contract, so that the blockchain node submitting the first random number resubmits the first random number within the second preset duration based on the prompt information.

As at least one alternative embodiment, the random number generation module is configured to: for each pair of the first digest value and the first random number, generate, by the smart contract, a second digest value based on the first random number, wherein an algorithm for generating the first digest value is the same as an algorithm for generating the second digest value; and if the second digest value is the same as the first digest value, determine that the first digest value and the corresponding first random number are successfully verified.

As at least one alternative embodiment, the random number generation module is further configured to determine, by the smart contract, the blockchain node corresponding to a successfully verified first random number, and send a virtual resource to the determined blockchain node.

As at least one alternative embodiment, the preset number threshold value is determined based on the number of the at least one blockchain node.

As at least one alternative embodiment, the service starting module is configured to receive options submitted by the at least one blockchain node respectively, and start a selection service to determine, based on the second random number, a target option from the options submitted by the at least one blockchain node respectively.

As at least one alternative embodiment, the service starting module is further configured to send a virtual resource to a blockchain node that submits the target option.

In order to achieve the above objectives, according to yet another aspect of the embodiment of the present disclosure, an electronic device for generating a random number in a blockchain is provided.

The electronic device for generating the random number in the blockchain according to the embodiment of the present disclosure includes: one or more processors; and a storage apparatus, configured to store one or more programs, wherein when the one or more programs are executed by the one or more processors, the one or more processors implement the method for generating the random number in the blockchain based on the embodiment of the present disclosure.

In order to achieve the above objectives, according to still another aspect of the embodiment of the present disclosure, a computer-readable storage medium is provided.

The computer-readable storage medium according to the embodiment of the present disclosure stores a computer program, and when executed by a processor, the program implements the method for generating the random number in the blockchain according to the embodiment of the present disclosure.

One embodiment in the above disclosure has the following advantages or beneficial effects: the first node in the blockchain is used to locally generate the first random number and the first digest value of the first random number, and then the first digest value is submitted to the smart contract. After the smart contract broadcasts the first service, each blockchain node may participate in the first service by submitting the participation information, and then the smart contract may determine the second node based on the order of the blockchain nodes submitting the participation information, and generate the second random number by combining the second digest value of the second node with the first random number that is submitted by the first node after the first service ends. Since the order of the blockchain nodes participating in the first service cannot be predetermined, that is, the order of the blockchain nodes participating in the first service is random, and then cheating cannot be performed during the process of determining the second node based on the order of the blockchain nodes submitting the participation information, thereby ensuring the randomness of the second node. Moreover, the first digest value submitted by the first node to the smart contract may be notified to each blockchain node in the blockchain, and the smart contract further verifies the first digest value and the first random number, so that cheating cannot be performed on the first digest value submitted by the first node and the first random number submitted after the first service ends. Therefore, cheating cannot be performed during the process when the smart contract generates the second random number based on the second digest value of the second node and the first random number submitted by the first node, that is, cheating cannot be performed during the generation process of the second random number, thereby improving the credibility of the generated random number. Further, the second service is started based on the generated trusted random number, so that the randomness of the result of the second service can be ensured, and the possibility of cheating caused by human intervention is avoided, thereby ensuring the fairness of the service result.

In addition, each blockchain node in the blockchain locally generates the first random number and the first digest value of the first random number, and then respectively submits the first digest value and the first random number to the smart contract in two stages (the first preset duration and the second preset duration), the smart contract verifies the received first digest value and the corresponding first random number, and generates the second random number based on the successfully verified first random number. Therefore, by means of respectively submitting the first digest value and the first random number to the smart contract in two stages, and verifying the first digest value and the first random number by the smart contract, the possibility of cheating in a random number generation process is avoided, thereby improving the credibility of the random numbers. Furthermore, the service is started based on the generated trusted random number, so that the randomness of the service result can be ensured, the possibility of cheating caused by human intervention is avoided, thereby ensuring the fairness of the service result.

Further effects of the above-mentioned non-customary optional manners will be described below in conjunction with specific embodiments.

BRIEF DESCRIPTION OF THE DRAWINGS

The drawings are used to better understand the present disclosure, and do not constitute improper limitations to the present disclosure, wherein:

FIG. 1 is a schematic diagram of main steps of a method for generating a random number in a blockchain according to an embodiment of the present disclosure;

FIG. 4 is a schematic diagram of main steps of a method for generating a random number in a blockchain according to an embodiment of the present disclosure;

FIG. 7 is a schematic diagram of main steps of yet another method for generating a random number in a blockchain according to an embodiment of the present disclosure;

DETAILED DESCRIPTION OF THE EMBODIMENTS

Figure 2:
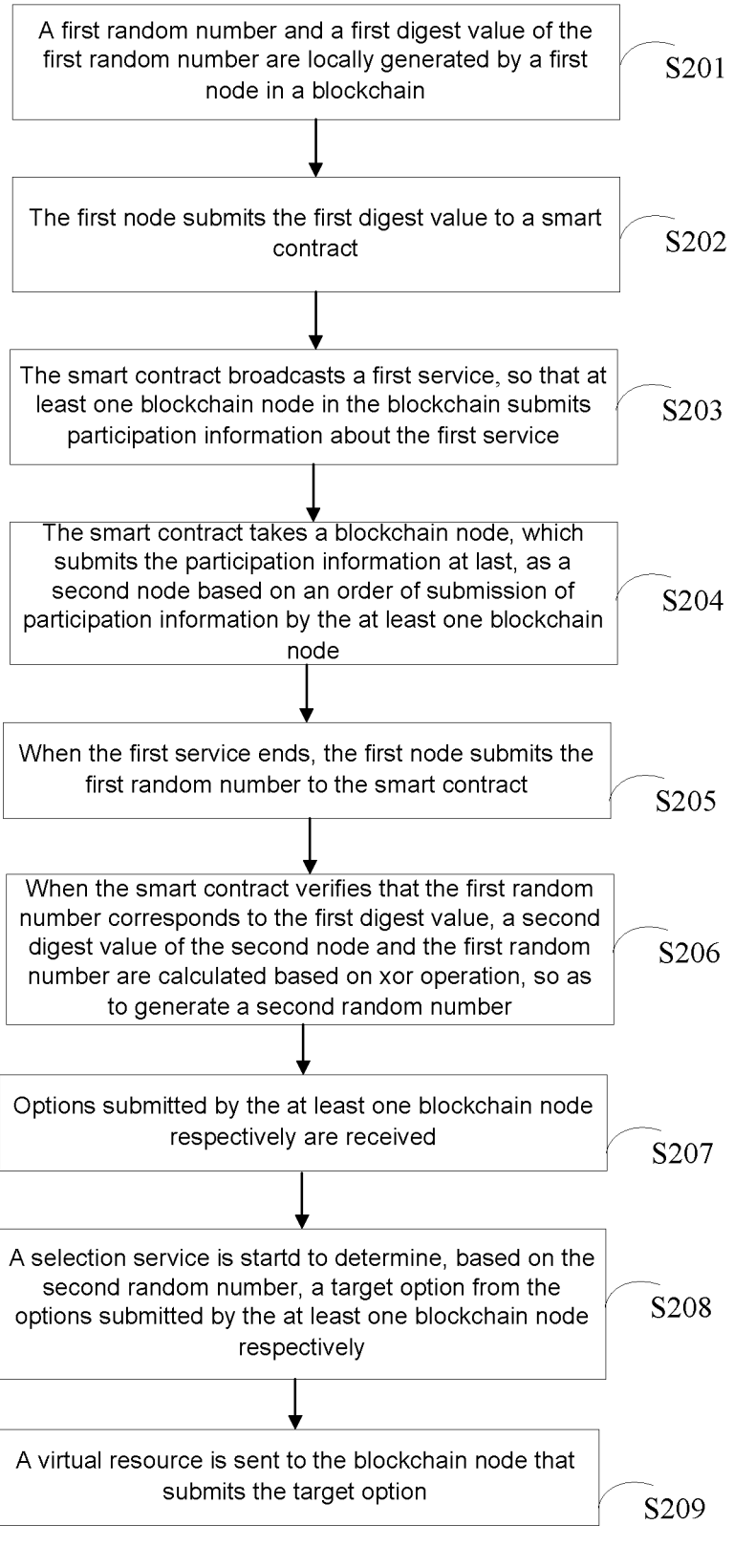
FIG. 2 is a schematic diagram of main steps of another method for generating a random number in a blockchain according to an embodiment of the present disclosure.

Exemplary embodiments of the present disclosure are described below in conjunction with the drawings, various details of the embodiments of the present disclosure are included therein to facilitate understanding, and they should be considered as exemplary only. Accordingly, those ordinary skilled in the art should be aware that various changes and modifications may be made to the embodiments described herein without departing from the scope and spirit of the present disclosure. Likewise, for clarity and conciseness, descriptions of well-known functions and structures are omitted in the following descriptions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in the case of no conflict, the embodiments of the present disclosure and the technical features in the embodiments may be combined with each other.

FIG. 1 is a schematic diagram of main steps of a method for generating a random number in a blockchain according to an embodiment of the present disclosure.

As shown in FIG. 1, the method for generating the random number in the blockchain according to the embodiment of the present disclosure mainly includes the following steps:

Step S101: a first random number and a first digest value of the first random number are locally generated by a first node in the blockchain.

In the embodiment of the present disclosure, a blockchain node corresponding to a provider of a first service may be taken as the first node. For example, each blockchain node in the blockchain may publish a first service by a smart contract, such as voting and auction activities. When the smart contract prepares to generate a second random number by means of the digest value of the blockchain node participating in the service, the blockchain node corresponding to the provider of the corresponding activity may be notified before the first service is started, so that the blockchain node locally generates the first random number and the first digest value of the first random number.

Of course, in addition to the foregoing embodiment, in the embodiment of the present disclosure, the first node may also be determined in other manners. For example, the first node may be determined by each blockchain node in the blockchain by means of voting, or the first node, which needs to locally generate the first random number and the first digest value, may be written into the smart contract in advance.

When generating the first digest value of the first random number, the first node may generate the first digest value by using a secure hash algorithm, for example, generate the first digest value corresponding to the first random number by means of the sha256 algorithm. For ease of description, the first random number generated by the first node in the blockchain is denoted as $k_1$, and the first digest value of $k_1$ is denoted as $h_1$.

Step S102: the first node submits the first digest value to the smart contract.

Before the first service is started, the first node determined in any one of the foregoing manners may submit the locally generated first digest value $h_1$ to the smart contract. Therefore, any blockchain node in the blockchain may know the first digest value $h_1$, which avoids cheating during the process when the first node submits the first digest value and the first random number, thereby facilitating to improve the credibility of the generated second random number.

Step S103: the smart contract broadcasts a first service, so that at least one blockchain node in the blockchain submits participation information about the first service.

The smart contract may broadcast the first service, such as voting and auction, to each blockchain node in the blockchain, so that each blockchain node participates in the first service based on the notification. The blockchain node participating in the first service will correspondingly submit participation information, for example, when participating in a voting activity, the blockchain node may send a target voted by the blockchain node itself to the smart contract.

Step S104: the smart contract determines a second node from the at least one blockchain node based on an order of submission of participation information by the at least one blockchain node.

In the embodiment of the present disclosure, the smart contract may determine the second node based on a preset target value and the order of submission of participation information by the at least one blockchain node. The preset target value may be any one of the foregoing order. For example, in order to avoid traversing the blockchain nodes participating in the first service to search for the second node, so as to improve the efficiency of determining the second node, the preset target value may be the last one in the foregoing order. For example, there are five blockchain nodes participating in the first service, and the order of the five blockchain nodes respectively submitting the participation information is: a blockchain node A, a blockchain node D, a blockchain node B, a blockchain node E and a blockchain node F. If the preset target value is the last one in the order of submitting participation information, then the determined second node is the blockchain node F in the present example. Of course, if the preset target value is second one in the order of submitting participation information, then the determined second node is the blockchain node D. Since neither is it impossible to predetermine which blockchain nodes in the blockchain participating in the first service, nor is it possible to predetermine the order of the blockchain nodes participating in the first service, cheating cannot be performed during the process of determining the second node based on the order of the blockchain nodes submitting the participation information, thereby ensuring the randomness of the second node, and thus facilitating to improve the credibility of the generated second random number.

Step S105: when the first service ends, the first node submits the first random number to the smart contract.

When the first node is the blockchain node corresponding to the provider of the first service, the first node may automatically know the end time of the first service, and the first node may actively submit the first random number $k_1$ to the smart contract after the first service ends. When the first node is a node selected by voting or a blockchain node written into the smart contract in advance, after the first service ends, the smart contract may send prompt information to the first node, so that the first node submits the first random number $k_1$ to the smart contract based on the prompt information.

Step S106: when the smart contract verifies that the first random number corresponds to the first digest value, a second random number is generated based on a second digest value of the second node and the first random number.

In the embodiment of the present disclosure, the smart contract may determine whether the first digest value corresponds to the first random number in the following manner: the smart contract generates a third digest value based on the first random number, wherein an algorithm for generating the first digest value is the same as an algorithm for generating the third digest value; and when the third digest value is the same as the first digest value, the smart contract determines that the first random number corresponds to the first digest value.

After receiving the first random number, the smart contract may the third digest value h', corresponding to the first random number $k_1$. It is worth mentioning that, when the third digest value corresponding to the first random number $k_1$ is calculated, the used algorithm is the same as the algorithm for calculating the first digest value $h_1$ based on the first random number $k_1$. For example, the blockchain node locally calculates the first digest value $h_1$ based on the first random number $k_1$ by means of the sha256 algorithm, then at the verification stage, the smart contract also uses the sha256 algorithm to calculate a third digest value h'$_1$ corresponding to the first random number $k_1$. In order that the smart contract may conveniently verify the received first digest value and the first random number, the algorithm for calculating the digest value corresponding to the first random number may be written into the smart contract in advance.

When the third digest value is the same as the first digest value $h_1$, the smart contract may determine that the first digest value $h_1$ corresponds to the first random number $k_1$, which indicates that the first node does not cheat during the process of submitting the first random number and the first digest value, and the first random number is trusted, so that the smart contract may generate the second random number based on the first random number and the second digest value of the second node. When the third digest value is different from the first digest value, it is determined that the first random number does not correspond to the first digest value, at this time, the smart contract may send prompt information to the first node, so that the first node re-sends the first random number based on the prompt information, so as to generate a trusted second random number.

When the second random number is generated, the second digest value and the first random number may be calculated based on a preset operation rule, so as to generate the second random number. The preset operation rule may be or operation, and operation, or xor operation, etc. For example, in the embodiment of the present disclosure, the first random number and the second digest value of the second node are calculated by using the xor operation, so as to generate the second random number. For example, when the second node is the last blockchain node that submits the participation information about the first service, that is, the random number is generated based on the digest value of the blockchain node that submits the participation information at last, and the first random number submitted by the first node.

In addition, in order to promote the determined first node to actively participate in the random number generation process, that is, to promote the first node to send the locally generated first digest value before the first service starts, and send the locally generated first random number after the first service ends, in the embodiment of the present disclosure, after the second random number is generated, the smart contract may send a virtual resource to the first node, so as to reward the first node, thereby improving the enthusiasm of the first node in the random number generation process.

Step S107: a second service is started based on the second random number.

It can be understood that, the generated trusted second random number may be applied to various services in the blockchain, for example, a generation service of a private key, a test service, a selection service, and the like. That is, multiple types of second services, such as the generation service, the test service and the selection service, in the blockchain may be started based on the trusted second random number. The types of the first service and the second service may be the same or different.

In the embodiment of the present disclosure, the application of the trusted second random number is described by taking the selection service as an example. In the blockchain, a plurality of selection services may be implemented in the blockchain by means of random numbers, for example, the generation of sports lottery tickets or welfare lottery tickets and the generation of winners, the selection of a successful bidder from a plurality of bidders with the same condition during bid inviting, and the selection of winners in a variety of activities such as company annual symposiums, promotion activities, promotion activities and the like.

When the selection service is started, at least one option submitted by the at least one blockchain node respectively may be received; and the selection service is started to determine, based on the second random number, a target option from the options submitted by the at least one blockchain node respectively.

In the present embodiment, the option submitted by the blockchain node is a selection corresponding to the blockchain node. Taking the selection of a winner in a company annual symposium as an example, the option corresponds to the job number or other identifiers corresponding to each employee. During the process of determining the target option based on the second random number, since the second random number is trusted, the selection process is random, thereby avoiding human intervention. Accordingly, the process of selecting the target option based on the second random number is random and fair. It can be understood that, the blockchain node corresponding to the selected target option is the blockchain node corresponding to the winner.

In order to ensure the openness and credibility of a reward issuing process, in one embodiment of the present disclosure, a virtual resource may be sent to the blockchain node that submits the target option by means of the smart contract, so as to issue a reward to the winner. Therefore, the reward issuing process is also performed in the blockchain, thereby ensuring the authenticity and credibility of the reward issuing process.

According to the above embodiment, as shown in FIG. 2, the method for generating the random number in the blockchain provided in the embodiment of the present disclosure may include the following steps:

Step S201: a first random number and a first digest value of the first random number are locally generated by a first node in the blockchain.

Step S202: the first node submits the first digest value to a smart contract.

Step S203: the smart contract broadcasts a first service, so that at least one blockchain node in the blockchain submits participation information about the first service.

Step S204: the smart contract takes a blockchain node, which submits the participation information at last, as a second node based on the order of submission of participation information by the at least one blockchain node.

Step S205: when the first service ends, the first node submits the first random number to the smart contract.

Step S206: when the smart contract verifies that the first random number corresponds to the first digest value, a second digest value of the second node and the first random number are calculated based on xor operation, so as to generate a second random number.

Step S207: options submitted by the at least one blockchain node respectively are received.

Step S208: a selection service is started to determine, based on the second random number, a target option from the options submitted by the at least one blockchain node respectively.

Step S209: a virtual resource is sent to the blockchain node that submits the target option.

As can be seen, according to the method for generating the random numbers in the blockchain in the embodiment of the present disclosure, the first node in the blockchain is used to locally generate the first random number and the first digest value of the first random number, and then the first digest value is submitted to the smart contract. After the smart contract broadcasts the first service, each blockchain node may participate in the first service by submitting the participation information, and then the smart contract may determine the second node based on the order of the blockchain nodes submitting the participation information, and generate the second random number by combining the second digest value of the second node with the first random number that is submitted by the first node after the first service ends. Since the order of the blockchain nodes participating in the first service cannot be predetermined, that is, the order of the blockchain nodes participating in the first service is random, and then cheating cannot be performed during the process of determining the second node based on the order of the blockchain nodes submitting the participation information, thereby ensuring the randomness of the second node. Moreover, the first digest value submitted by the first node to the smart contract may be notified to each blockchain node in the blockchain, and the smart contract further verifies the first digest value and the first random number, so that cheating cannot be performed on the first digest value submitted by the first node and the first random number submitted after the first service ends. Therefore, cheating cannot be performed during the process when the smart contract generates the second random number based on the second digest value of the second node and the first random number submitted by the first node, that is, cheating cannot be performed during the generation process of the second random number, thereby improving the credibility of the generated random number. Further, the second service is started based on the generated trusted random number, so that the randomness of the result of the second service can be ensured, and the possibility of cheating caused by human intervention is avoided, thereby ensuring the fairness of the service result.

Figure 3:
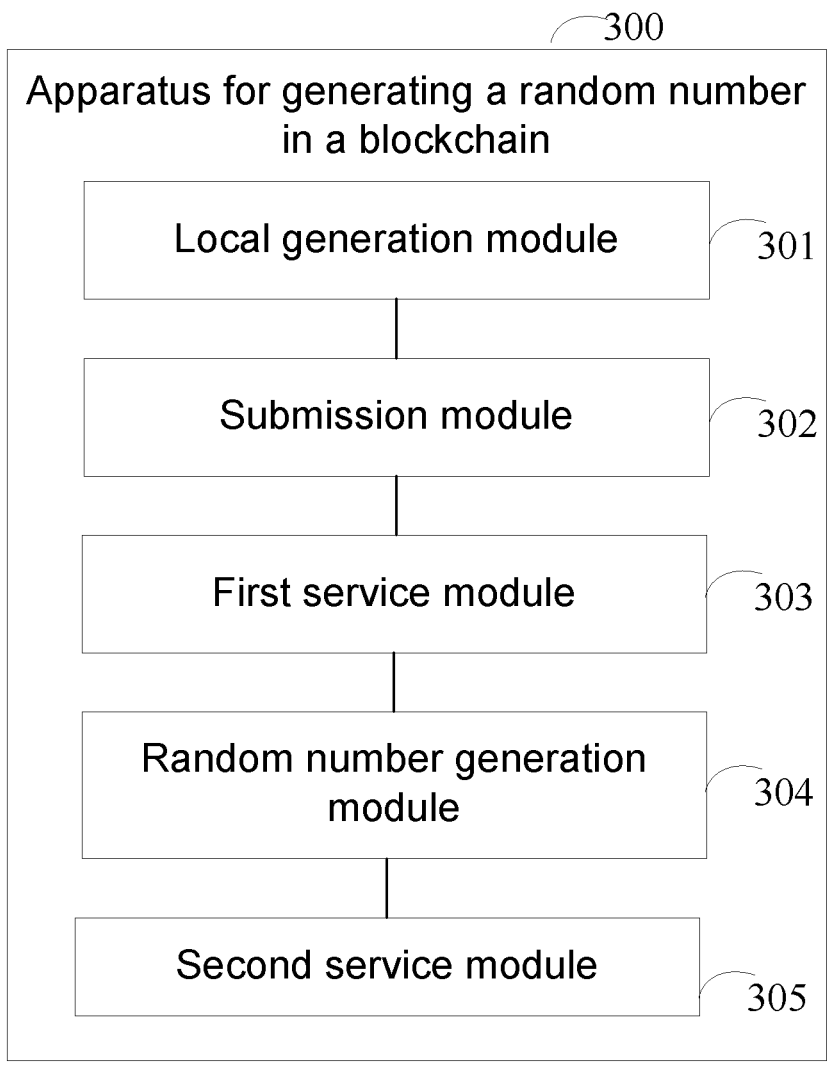
FIG. 3 is a schematic diagram of main modules of an apparatus for generating a random number in a blockchain according to an embodiment of the present disclosure.

FIG. 3 is a schematic diagram of main modules of an apparatus for generating a random number in a blockchain according to an embodiment of the present disclosure.

As shown in FIG. 3, an apparatus 300 for generating random numbers in the blockchain according to the embodiment of the present disclosure includes a local generation module 301, a submission module 302, a first service module 303, a random number generation module 304, and a second service module 305, wherein, the local generation module 301 is configured to locally generate, by a first node in the blockchain, a first random number and a first digest value of the first random number;

the submission module 302 is configured to submit the first digest value to a smart contract by using the first node; and when the first service ends, submit the first random number to the smart contract by using the first node;

the first service module 303 is configured to broadcast a first service by the smart contract, so that at least one blockchain node in the blockchain submits participation information about the first service;

the random number generation module 304 is configured to determine, by the smart contract, a second node from the at least one blockchain node based on the order of submission of participation information by the at least one blockchain node; and when the smart contract verifies that the first random number corresponds to the first digest value, generate a second random number based on a second digest value of the second node and the first random number; and the second service module 305 is configured to start a second service based on the second random number.

In an embodiment of the present disclosure, the random number generation module 304 is configured to determine the second node based on a preset target value and the order of submission of participation information by the at least one blockchain node.

In an embodiment of the present disclosure, the preset target value is the last one in the order.

In an embodiment of the present disclosure, the random number generation module 304 is configured to calculate the second digest value and the first random number based on a preset operation rule, so as to generate the second random number.

In an embodiment of the present disclosure, the random number generation module 304 is configured to generate, by the smart contract, a third digest value based on the first random number, wherein an algorithm for generating the first digest value is the same as an algorithm for generating the third digest value; and when the third digest value is the same as the first digest value, determine that the first random number corresponds to the first digest value.

In an embodiment of the present disclosure, the local generation module 301 is configured to take, as the first node, a blockchain node corresponding to a provider of the first service.

In an embodiment of the present disclosure, the second service module 305 is further configured to send a virtual resource to the first node by the smart contract.

In an embodiment of the present disclosure, the second service module 305 is configured to receive options submitted by the at least one blockchain node respectively; and start a selection service to determine, based on the second random number, a target option from the options submitted by the at least one blockchain node respectively.

In an embodiment of the present disclosure, the second service module 305 is further configured to send a virtual resource to the blockchain node that submits the target option.

As can be seen, according to the apparatus for generating the random number in the blockchain in the embodiment of the present disclosure, the first node in the blockchain is used to locally generate the first random number and the first digest value of the first random number, and then the first digest value is submitted to the smart contract. After the smart contract broadcasts the first service, each blockchain node may participate in the first service by submitting the participation information, and then the smart contract may determine the second node based on the order of the blockchain nodes submitting the participation information, and generate the second random number by combining the second digest value of the second node with the first random number that is submitted by the first node after the first service ends. Since the order of the blockchain nodes participating in the first service cannot be predetermined, that is, the order of the blockchain nodes participating in the first service is random, and then cheating cannot be performed during the process of determining the second node based on the order of the blockchain nodes submitting the participation information, thereby ensuring the randomness of the second node. Moreover, the first digest value submitted by the first node to the smart contract may be notified to each blockchain node in the blockchain, and the smart contract further verifies the first digest value and the first random number, so that cheating cannot be performed on the first digest value submitted by the first node and the first random number submitted after the first service ends. Therefore, cheating cannot be performed during the process when the smart contract generates the second random number based on the second digest value of the second node and the first random number submitted by the first node, that is, cheating cannot be performed during the generation process of the second random number, thereby improving the credibility of the generated random number. Further, the second service is started based on the generated trusted random number, so that the randomness of the result of the second service can be ensured, and the possibility of cheating caused by human intervention is avoided, thereby ensuring the fairness of the service result.

FIG. 4 is a schematic diagram of main steps of a method for generating a random number in a blockchain according to an embodiment of the present disclosure.

As shown in FIG. 4, the method for generating the random number in the blockchain according to the embodiment of the present disclosure mainly includes the following steps:

Step S401: at least one blockchain node locally generates a first random number and a first digest value of the first random number.

In the embodiment of the present disclosure, each blockchain node corresponds to one user address, and the user address may correspond to user information of one user, and may also correspond to the address of a server.

When generating the random number, the blockchain node in the blockchain locally generates the first random number, and generates the first digest value of the first random number by means of the secure hash algorithm, for example, generates the first digest value corresponding to the first random number by means of the sha256 algorithm. For ease of description, the first random number generated by the ith blockchain node in the blockchain is denoted as $k_i$, and the first digest value of $k_i$ is denoted as $h_i$.

Step S402: the at least one blockchain node respectively submits the first digest value to a smart contract of the blockchain within a first preset duration.

Step S403: the at least one blockchain node submits the first random number to the smart contract within a second preset duration that is started after the first preset duration ends.

After generating the first random number $k_i$ and the first digest value $h_i$, the ith blockchain node in the blockchain may submit $h_i$ to the smart contract within the first preset duration based on the broadcast of the smart contract, and may also actively submit $h_i$ to the smart contract. For example, if the first preset duration is 15 min, within the 15 min, any blockchain node in the blockchain may submit the locally generated first digest value to the smart contract. After the 15 min ends, the smart contract enters the second preset duration.

After the first preset duration ends, the smart contract starts the second preset duration, the blockchain node cannot submit the first digest value to the smart contract, but submits the first random number to the smart contract. For example, the second preset duration is also 15 min, within 15 min after the first preset duration ends, the blockchain node cannot submit the first digest value to the smart contract, but the ith blockchain node in the blockchain may submit the first random number $k_i$ to the smart contract.

It can be understood that, the first preset duration and the second preset duration may be the same duration, and may also be different durations.

Figures 5, 6:
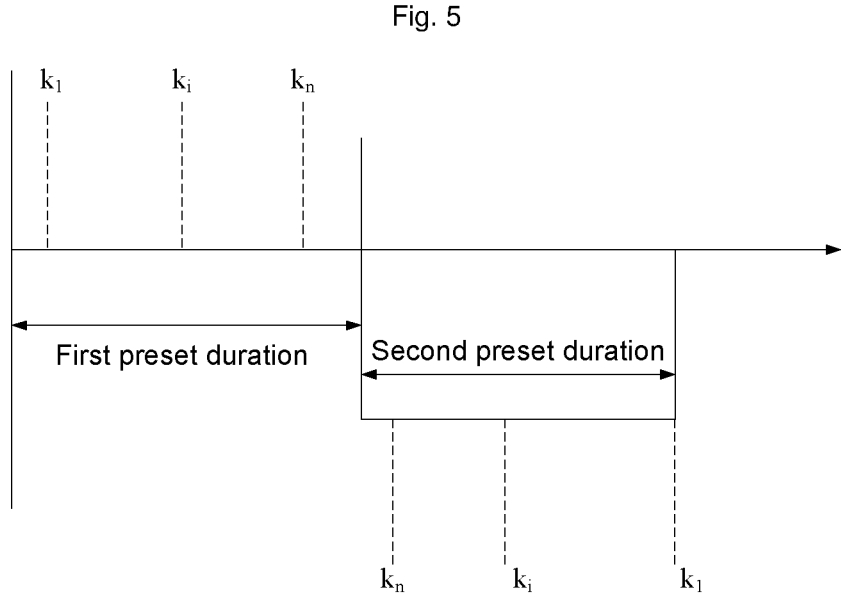
FIG. 5 is a schematic diagram of a time axis of a first preset duration and a second preset duration according to an embodiment of the present disclosure.
FIG. 6 is a schematic diagram of another time axis of a first preset duration and a second preset duration according to an embodiment of the present disclosure.

When the ith blockchain node submits $h_i$ to the smart contract within the first preset duration based on the broadcast of the smart contract, the content broadcast by the smart contract may include: prompt information of starting to submit the first digest value, and the first preset duration. In this case, the starting point of the first preset duration is a moment when the smart contract sends the broadcast, so that each blockchain node submits the first digest value to the smart contract within the first preset duration after receiving the broadcast of the smart contract. At this time, the schematic diagram of the time axis of the first preset duration and the second preset duration, and a time point when the first digest value $h_i$ at the head of the order is received may be shown in FIG. 5. In FIG. 5, $h_i$ represents the first digest value $h_1$ at the head of the order that is received by the smart contract within the first preset duration, and $h_n$ represents the last first digest value that is received by the smart contract within the first preset duration. $k_1$ represents the first random number corresponding to $h_1$, and $k_n$ represents the first random number corresponding to $h_n$.

As can be seen from FIG. 5, the order of the smart contract receiving the first digest values and the order of receiving the first random numbers respectively corresponding thereto may not completely correspond, that is, the first digest value (e.g., $h_1$) received at first within the first preset duration does not represent that the corresponding first random number (e.g., $k_1$) must be received at first within the second duration, each blockchain node merely needs to send the first digest value within the first preset duration, and send the first random number within the second preset duration, without ensuring that the blockchain node that first sends the first digest value must first send the first random number. Of course, FIG. 5 is merely a schematic diagram that may be implemented, in the embodiment of the present disclosure, there may also be other situations. For example, the moment when the smart contract receives the last first digest value may also be the moment when the first preset duration ends. As another example, the order of the smart contract receiving the first digest values corresponds to the order of receiving the first random numbers respectively corresponding thereto.

In addition, when the ith blockchain node actively submits $h_i$ to the smart contract within the first preset duration, the smart contract starts the timing of the first preset duration when receiving the first digest value which is sent by the first blockchain node. That is, in this case, the starting point of the first preset duration is the moment when the smart contract receives the first digest value at the head of the order. At this time, the schematic diagram of the time axis of the first preset duration and the second preset duration, and the time point where the first abstract value $h_i$ at the head of the order is received may be as shown in FIG. 6.

Step S404: the smart contract verifies the received at least one first digest value and the first random number corresponding to the first digest value.

In an embodiment of the present disclosure, the smart contract may verify the first digest value and the first random number, which are submitted by the blockchain node, in the following manner: within the second preset duration, every time upon receiving one first random number, the smart contract determines whether the first digest value corresponding to the first random number has been received, and the first digest value is received within the first preset duration; and if so, the smart contract verifies the first random number and the corresponding first digest value; if verifying successful, the number of the successfully verified first random number is progressively increased; and if verifying unsuccessfully, the smart contract sends prompt information, so that the blockchain node submitting the first random number resubmits the first random number within the second preset duration based on the prompt information.

For example, after the second preset duration starts, when the smart contract receives the first random number $k_i$ sent by the ith blockchain node, the smart contract determines whether $h_i$ corresponding to the first random number $k_i$ has been received within the first preset duration; and if the smart contract determines that the $h_i$ corresponding to the first random number $k_i$ has been received within the first preset duration, the smart contract may verify the pair of $k_i$ and $h_i$.

For example, in an embodiment of the present disclosure, the smart contract may verify the first digest value and the first random number in the following manner: for each pair of the first digest value and the first random number, a second digest value is generated based on the first random number, wherein an algorithm for generating the first digest value is the same as an algorithm for generating the second digest value; and when the second digest value is the same as the first digest value, it is determined that the first digest value and the corresponding first random number are successfully verified.

Still taking it as an example that the smart contract determines that $h_i$ corresponding to the first random number $k_i$ has been received within the first preset duration, at this time, the smart contract calculates the second digest value $h'_1$ corresponding to the first random number $k_i$. It is worth mentioning that, when the second digest value $h'_1$ corresponding to the first random number $k_i$ is calculated, the used algorithm is the same as the algorithm for calculating the first digest value $h_i$ based on the first random number $k_i$. For example, the blockchain node locally calculates the first digest value $h_i$ corresponding to the first random number $k_1$ by means of the sha256 algorithm, then at the verification stage, the smart contract also uses the sha256 algorithm to calculate the second digest value $h'_i$ corresponding to the first random number $k_1$. In order that the smart contract may conveniently verify the received first digest value and the first random number, the algorithm for calculating the digest value corresponding to the first random number may be written into the smart contract in advance.

When the second digest value $h'_1$ is the same as the first digest value $h_i$, it is determined that the first digest value $h_i$ and the first random number $k_i$ are successfully verified, and at this time, the smart contract progressively increases the number of the successfully verified first random number. For example, before verifying the first digest value $h_i$ and the first random number $k_i$, the smart contract has verified (i−1) pairs of first digest value and first random number, and the (i−1) pairs of the first digest value and first random number are all successfully verified, that is, the number of the successfully verified first random number is i−1. Then, after the first digest value $h_i$ and the first random number $k_i$ are verified, the number of the successfully verified first random numbers is progressively increased to i.

When the second digest value $h'_1$ is not the same as the first digest value $h_i$, it is determined that the verification of the first digest value $h_i$ and the first random number $k_i$ fails, at this time, the smart contract sends prompt information, so that the ith blockchain node submitting the first random number $k_i$ resubmits the first random number within the second preset duration based on the prompt information, so as to generate the trusted random number.

Step S405: second random number is generated based on the successfully verified first random number.

In order to further improve the credibility of the generated second random number, in the embodiment of the present disclosure, when it is determined that the number of the successfully verified first random number is not less than a preset number threshold value, the smart contract generates the second random number based on the successfully verified first random number. The preset number threshold value is determined based on the number of the at least one blockchain node. It can be understood that, when the number of the successfully verified first random number is less than the preset number threshold value, the second random number cannot be generated. If the second random number needs to be continuously generated, the at least one blockchain node needs to resubmit the first digest value and the first random number.

For example, the preset number threshold value may be the total number of the at least one blockchain node. In the at least one blockchain node, the first digest value is submitted to the smart contract within the first preset duration, and the preset number threshold value is the total number of the at least one blockchain node, therefore within the second preset duration, it is required that the at least one blockchain node must submit the first random number corresponding to the first digest value, and then the smart contract may generate the second random number based on each submitted first random number. That is, in this case, if the first digest value has been submitted within the first preset duration, the corresponding first random number must be submitted within the second preset duration, and then the smart contract may generate the second random number.

In the above manner, the requirements for each blockchain node in the blockchain are strict, if a blockchain node submits the first digest value within the first preset duration, but does not submit the corresponding first random number within the second preset duration, the second random number is failed to be generated. Therefore, in order to improve the success rate of generating the trusted random number, in an example embodiment of the present disclosure, the preset number threshold value is set to be a value less than the total number (m) of the at least one blockchain node, for example, the preset number threshold value is set to be m/2 or 3 m/4. In this way, when the smart contract determines that the number of the successfully verified first random numbers is not less than the preset number threshold value, the smart contract directly generates the second random number based on the successfully verified first random number without verifying the received first random number afterwards, thereby improving the success rate and efficiency of generating the second random number.

Of course, after the smart contract verify all first random numbers received within the second preset duration, for example, n first random numbers are received within the second preset duration, the number of the successfully verified first random numbers is n–1, and n–1 is greater than the preset number threshold value (assuming that the preset number threshold value is n–5), then the smart contract may generate the second random number based on the n–1 successfully verified first random numbers.

In the embodiment of the present disclosure, when generating the second random number based on the successfully verified first random number, the smart contract may calculate the successfully verified first random number based on a preset operation rule, so as to generate the second random number. The preset operation rule may be or operation, and operation, or xor operation, etc. For example, in the embodiment of the present disclosure, the successfully verified first random number is calculated by using the xor operation, so as to generate the second random number.

In order to further improve the randomness of the second random number, when generating the second random number, the smart contract may further determine, from the at least one blockchain node, a blockchain node that submits the first random number at last; and calculates, based on a preset operation rule, a digest value of the blockchain node that submits the first random number at last, and the successfully verified first random number, so as to generate the second random number.

In the present embodiment, the blockchain node that submits the first random number at last refers to a submission node of the last first random number among the successfully verified first random numbers. For example, there are n successfully verified first random numbers, the digest value of the blockchain node that submits the nth first random number is H, and then the smart contract may calculate the n first random numbers and H based on the preset operation rule, so as to generate the second random number. The preset operation rule may be or operation, and operation, or xor operation, etc. For example, in the embodiment of the present disclosure, the successfully verified first random number and the digest value H of the blockchain node that submits the first random number at last are calculated by using the xor operation, so as to generate the second random number.

In addition, in order to promote each blockchain node in the blockchain to participate in the generation of the random number, that is, to promote each blockchain node to send the first digest value within the first preset duration and send the first random number within the second preset duration, in the embodiment of the present disclosure, after the second random number is generated, virtual resources may be sent to the blockchain nodes corresponding to the successfully verified first random numbers by means of the smart contract, so as to issue rewards to these blockchain nodes, thereby promoting more blockchain nodes to participate in the generation of the second random number by means of sending the corresponding first digest values within the first preset duration and the first random numbers within the second preset duration.

Step S406: a service is started based on the second random number.

It can be understood that, the generated trusted second random number may be applied to various services in the blockchain, for example, a generation service of a private key, a test service, a selection service, and the like.

In the embodiment of the present disclosure, the application of the trusted second random number is described by taking the selection service as an example. In the blockchain, a plurality of selection services may be implemented in the blockchain by means of random numbers. For example, the generation of sports lottery tickets or welfare lottery tickets and the generation of winners, the selection of a successful bidder from a plurality of bidders with the same condition during bid inviting, and the selection of winners in a variety of activities such as company annual symposiums, promotion activities, promotion activities and the like.

When the selection service is started, at least one option submitted by the at least one blockchain node respectively may be received; and the selection service is started to determine, based on the second random number, a target option from the options submitted by the at least one blockchain node respectively.

In the present embodiment, the option submitted by the blockchain node is a selection corresponding to the blockchain node. Taking the selection of a winner in a company annual symposium as an example, the option corresponds to the job number or other identifiers corresponding to each employee. During the process of determining the target option based on the second random number, since the second random number is trusted, the selection process is random, thereby avoiding human intervention, accordingly, the process of selecting the target option based on the second random number is random and fair. It can be understood that, the blockchain node corresponding to the selected target option is the blockchain node corresponding to the winner.

In order to ensure the openness and credibility of a reward issuing process, in one embodiment of the present disclosure, a virtual resource may be sent to the blockchain node that submits the target option by means of the smart contract, so as to issue a reward to the winner. Therefore, the reward issuing process is also performed in the blockchain, thereby ensuring the authenticity and credibility of the reward issuing process.

According to the above embodiment, as shown in FIG. 7, the method for generating the random number in the blockchain provided in the embodiment of the present disclosure may include the following steps:

Step S701: at least one blockchain node locally generates a first random number and a first digest value of the first random number.

Step S702: the at least one blockchain node respectively submits the first digest value to a smart contract of the blockchain within a first preset duration.

Step S703: the at least one blockchain node submits the first random number to the smart contract within a second preset duration that is started after the first preset duration ends.

Step S704: within the second preset duration, every time upon receiving one first random number, the smart contract verifies the first random number based on the first digest value corresponding to the first random number, which has been received within the first preset duration, if verifying successful, step S705 is executed, and if verifying unsuccessfully, step S706 is executed.

Step S705: the number of the successfully verified first random number is progressively increased.

Step S706: the smart contract sends prompt information, so that the blockchain node submitting the first random number resubmits the first random number within the second preset duration based on the prompt information, and executes step S704.

Step S707: when it is determined that the number of the successfully verified first random number is not less than a preset number threshold value, the smart contract calculates the successfully verified first random number based on xor operation, so as to generate the second random number.

Step S708: options submitted by the at least one blockchain node respectively are received.

Step S709: a selection service is started to determine, based on the second random number, a target option from the options submitted by the at least one blockchain node respectively.

Step S710: a virtual resource is sent to the blockchain node that submits the target option.

As can be seen based on the method for generating the random number in the blockchain in the embodiment of the present disclosure, each blockchain node in the blockchain locally generates the first random number and the first digest value of the first random number, and then respectively submits the first digest value and the first random number to the smart contract in two stages (the first preset duration and the second preset duration). The smart contract verifies the received first digest value and the corresponding first random number, and generates the second random number based on the successfully verified first random number. Therefore, by means of respectively submitting the first digest value and the first random number to the smart contract in two stages, and verifying the first digest value and the first random number by the smart contract, the possibility of cheating in a random number generation process is avoided, thereby improving the credibility of the random numbers. Furthermore, the service is started based on the generated trusted random number, so that the randomness of the service result can be ensured, the possibility of cheating caused by human intervention is avoided, thereby ensuring the fairness of the service result.

Figure 8:
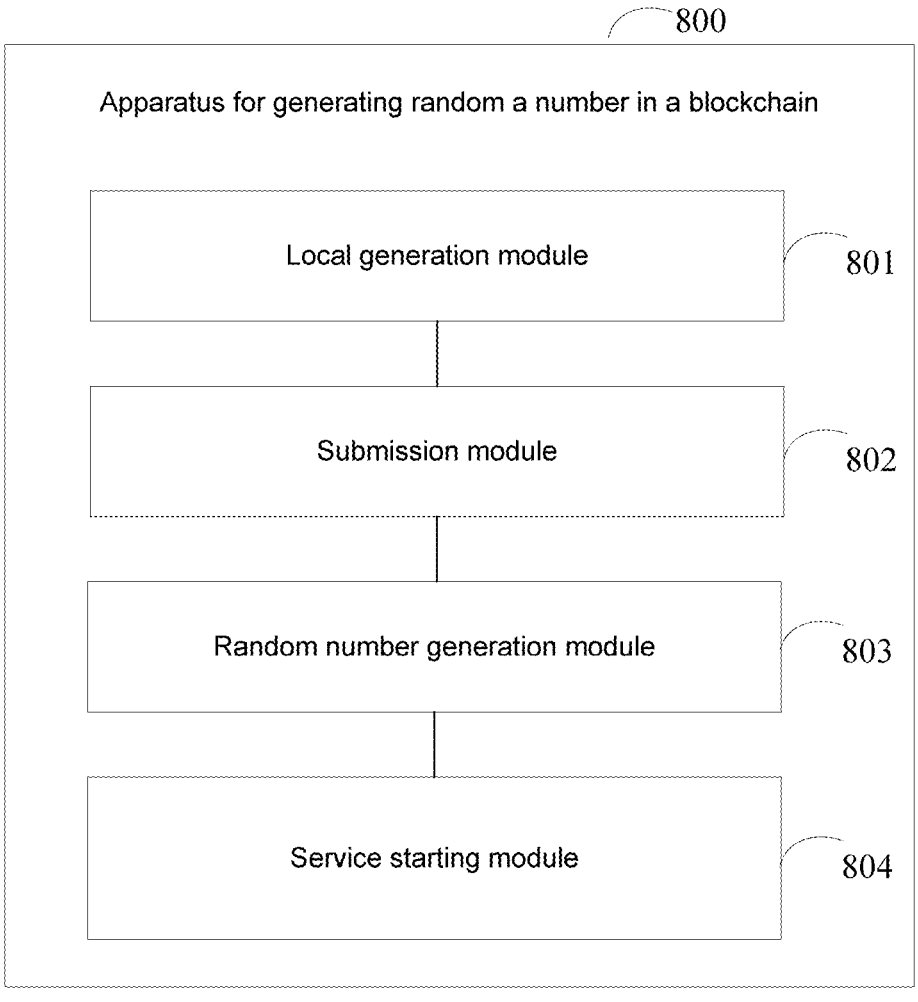
FIG. 8 is a schematic diagram of main modules of another apparatus for generating a random number in a blockchain according to an embodiment of the present disclosure.

FIG. 8 is a schematic diagram of main modules of an apparatus for generating a random number in a blockchain according to an embodiment of the present disclosure.

As shown in FIG. 8, an apparatus 800 for generating a random number in the blockchain according to the embodiment of the present disclosure includes: a local generation module 801, a submission module 802, a random number generation module 803, and a service startup module 804, wherein, the local generation module 801 is configured to locally generate, by using at least one blockchain node, a first random number and a first digest value of the first random number;

the submission module 802 is configured to respectively submit, by using the at least one blockchain node, the first digest value to a smart contract of the blockchain within a first preset duration; and submit, by using the at least one blockchain node, the first random number to the smart contract within a second preset duration that is started after the first preset duration ends;

the random number generation module 803 is configured to verify, by the smart contract, the received at least one first digest value and the first random number corresponding to the first digest value, and generate a second random number based on the successfully verified first random number; and the service starting module 804 is configured to start a service based on the second random number.

In an embodiment of the present disclosure, the random number generation module 803 is configured to: when the smart contract determines that the number of the successfully verified first random number is not less than a preset number threshold value, generate the second random number based on the successfully verified first random number.

In an embodiment of the present disclosure, the random number generation module 803 is configured to calculate the successfully verified first random number based on a preset operation rule, so as to generate the second random number.

In an embodiment of the present disclosure, the random number generation module 803 is configured to determine, by the smart contract and from the at least one blockchain node, a blockchain node that submits the first random number at last; and calculate, based on a preset operation rule, a digest value of the blockchain node that submits the first random number at last, and the successfully verified first random numbers, so as to generate the second random number.

In an embodiment of the present disclosure, the random number generation module 803 is configured to: within the second preset duration, every time when the smart contract receives one first random number, determine whether the first digest value corresponding to the first random number has been received, and the first digest value is received within the first preset duration; if so, verify the first random number and the corresponding first digest value; when the verification succeeds, progressively increase the number of the successfully verified first random number; and when the verification fails, send prompt information by the smart contract, so that the blockchain node submitting the first random number resubmits the first random number within the second preset duration based on the prompt information.

In an embodiment of the present disclosure, the random number generation module 803 is configured to: for each pair of the first digest value and the first random number, generate, by the smart contract, a second digest value based on the first random number, wherein an algorithm for generating the first digest value is the same as an algorithm for generating the second digest value; and when the second digest value is the same as the first digest value, determine that the first digest value and the corresponding first random number are successfully verified.

In an embodiment of the present disclosure, the random number generation module 803 is further configured to determine, by the smart contract, the blockchain node corresponding to the successfully verified first random number, and send a virtual resource to the determined blockchain node.

In an embodiment of the present disclosure, the preset number threshold value is determined based on the number of the at least one blockchain node.

In an embodiment of the present disclosure, the service starting module 804 is configured to receive options submitted by the at least one blockchain node respectively, and start a selection service to determine, based on the second random number, a target option from the options submitted by the at least one blockchain node respectively.

In an embodiment of the present disclosure, the service starting module 804 is further configured to send a virtual resource to the blockchain node that submits the target option.

As can be seen based on the apparatus for generating the random number in the blockchain in the embodiment of the present disclosure, each blockchain node in the blockchain locally generates the first random number and the first digest value of the first random number, and then respectively submits the first digest value and the first random number to the smart contract in two stages (the first preset duration and the second preset duration), the smart contract verifies the received first digest value and the corresponding first random number, and generates the second random number based on the successfully verified first random number. Therefore, by means of respectively submitting the first digest value and the first random number to the smart contract in two stages, and verifying the first digest value and the first random number by the smart contract, the possibility of cheating in a random number generation process is avoided, thereby improving the credibility of the random numbers. Furthermore, the service is started based on the generated trusted random number, so that the randomness of the service result can be ensured, the possibility of cheating caused by human intervention is avoided, thereby ensuring the fairness of the service result.

Figures 9, 10:
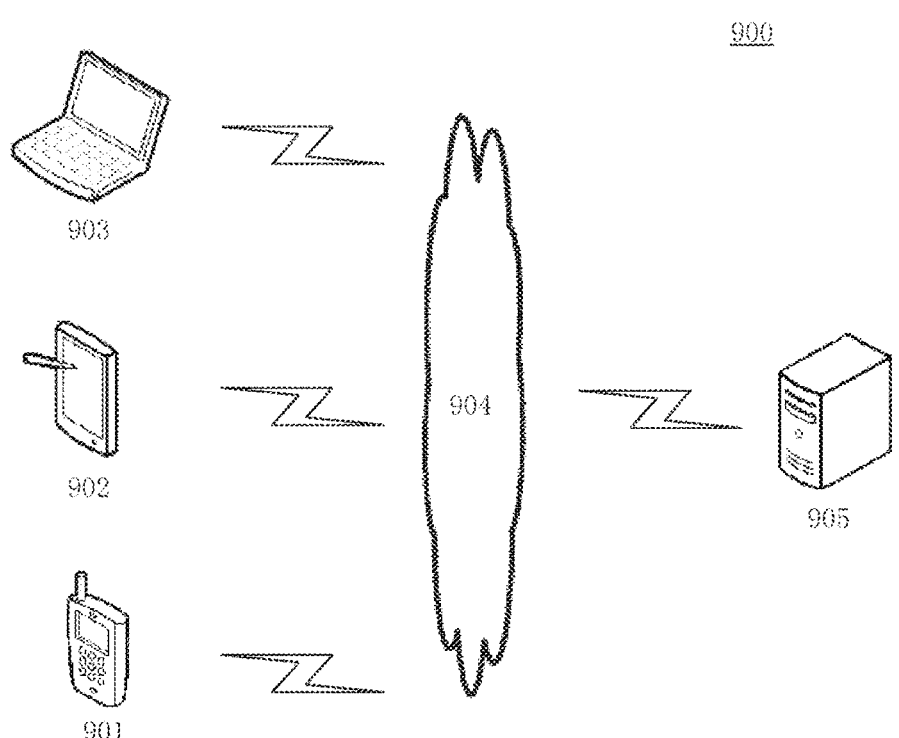
FIG. 9 is a diagram of an exemplary system architecture in which an embodiment of the present disclosure may be applied.
FIG. 10 is a schematic structural diagram of a computer system suitable for implementing a terminal device or a server according to an embodiment of the present disclosure.

FIG. 9 shows an exemplary system architecture 900 in which a method for generating a random number in a blockchain or an apparatus for generating a random number in a blockchain according to an embodiment of the present disclosure may be applied.

As shown in FIG. 9, the system architecture 900 may include terminal devices 901, 902 and 903, a network 904, and a server 905. The network 904 is used for providing a media for communication links between the terminal devices 901, 902 and 903 and the server 905. The network 904 may include various connection types, such as wired, wireless communication links, optical fiber cables, and the like.

A user may interact with the server 905 via the network 904 by using the terminal devices 901, 902 and 903, so as to receive or send messages or the like. Various communication client applications, such as shopping applications, webpage browser applications, search applications, instant messaging tools, mailbox clients, social platform software, and the like, may be installed on the terminal devices 901, 902 and 903.

The terminal devices 901, 902 and 903 may be various electronic devices having display screens and supporting webpage browsing, including, but not limited to, smart phones, tablet computers, laptop portable computers, desktop computers, and the like.

The server 905 may be a server that provides various services, for example, a background management server that supports shopping websites browsed by the user using the terminal devices 901, 902 and 903. The background management server may perform processing, such as analysis, on data such as a received product information query request, and feed back a processing result (such as target push information and product information) to the terminal devices.

It should be noted that, the method for generating the random numbers in the blockchain provided in the embodiment of the present disclosure is generally executed by the server 905, and correspondingly, the apparatus for generating the random numbers in the blockchain is generally disposed in the server 905.

It should be understood that, the number of terminal devices, networks and servers in FIG. 9 is merely illustrative. Based on implementation requirements, there may be any number of terminal devices, networks and servers.

Referring now to FIG. 10, it shows a schematic structural diagram of a computer system 1000 suitable for implementing a terminal device according to an embodiment of the present disclosure. The terminal device shown in FIG. 10 is merely an example, and should not bring any limitation to the functions and use ranges of the embodiment of the present disclosure.

As shown in FIG. 10, the computer system 1000 includes a central processing unit (CPU) 1001, which may execute various appropriate actions and processing based on programs stored in a read-only memory (ROM) 1002 or programs loaded from a storage portion 1008 into a random access memory (RAM) 1003. In the RAM 1003, various programs and data required by the operations of the system 1000 are also stored. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse and the like; an output portion 1007 including a cathode ray tube (CRT), a liquid crystal display (LCD), a loudspeaker, and the like; a storage portion 1008 including a hard disk; and a communication portion 1009 including a network interface card, such as an LAN card, a modem, or the like. The communication portion 1009 executes communication processing via a network such as the Internet. A drive 1010 is also connected to the I/O interface 1005 as needed. A removable medium 1011, such as a magnetic disk, an optical disk, a magneto-optical disk, a semiconductor memory and the like are installed on the drive 1010 as needed, so that a computer program read therefrom may be conveniently installed in the storage portion 1008 as needed.

In particular, according to embodiments disclosed in the present disclosure, the process described above with reference to the flow diagrams may be implemented as a computer software program. For example, the embodiments disclosed in the present disclosure includes a computer program product, which includes a computer program carried on a computer-readable medium, and the computer program contains program codes for executing the method shown in the flow diagrams. In such an embodiment, the computer program may be downloaded and installed from the network through the communication portion 1009, and/or installed from the removable medium 1011. When executed by the central processing unit (CPU) 1001, the computer program executes the above functions defined in the system of the present disclosure.

It should be noted that, the computer-readable medium shown in the present disclosure may be a computer-readable signal medium or a computer-readable storage medium or any combination thereof. The computer-readable storage medium may be, for example, but is not limited to, electrical, magnetic, optical, electromagnetic, infrared, or semiconductor systems, apparatuses or devices, or a combination of any of the above systems, apparatuses or devices. More specific examples of the computer-readable storage medium may include, but are not limited to: an electrical connection with one or more wires, a portable computer disk, a hard disk, a random access memory (RAM), a read only memory (ROM), an erasable programmable read only memory (EPROM or a flash memory), an optical fiber, a portable compact disc read-only memory (CD-ROM), an optical storage device, a magnetic storage device, or any suitable combination of the above devices. In the present disclosure, the computer-readable storage medium may be any tangible medium that contains or stores a program, and the program may be used by or combined with an instruction execution system, apparatus or device for use. In the present disclosure, the computer-readable signal medium may include a data signal propagated in a baseband or as part of a carrier, and computer-readable program codes are carried therein. Such a propagated data signal may take a variety of forms, including, but not limited to, an electromagnetic signal, an optical signal, or any suitable combination thereof. The computer-readable signal medium may also be any computer-readable medium other than the computer-readable storage medium, and the computer-readable medium may send, propagate or transmit a program, which is used by or combined with the instruction execution system, apparatus or device for use. The program codes contained on the computer-readable medium may be transmitted by any suitable medium, including, but not limited to: wireless, wire, optical cable, RF, and the like, or any suitable combination of the above manners.

The flow diagrams and block diagrams in the figures illustrate the system architectures, functions and operations of possible implementations of systems, methods and computer program products in accordance with various embodiments of the present disclosure. In this regard, each block in the flow diagrams or the block diagrams may represent a module, a program segment, or a part of a code, and the module, the program segment, or the part of the code contains one or more executable instructions for implementing specified logical functions. It should also be noted that, in some alternative implementations, the functions annotated in the block may occur out of the order annotated in the figures. For example, two blocks represented in succession may, in fact, be executed substantially in parallel, and may sometimes be executed in a reverse order, depending on the functions involved. It should also be noted that, each block in the block diagrams or the flow diagrams, and combinations of the blocks in the block diagrams or the flow diagrams may be implemented by dedicated hardware-based systems, which are used for executing specified functions or operations, or may be implemented by combinations of dedicated hardware and computer instructions.

The modules involved in the embodiments of the present disclosure may be implemented in a software manner, and may also be implemented in a hardware manner. The described modules may also be disposed in a processor, for example, it may be described as follows: a processor includes a local generation module, a submission module, a first service module, a random number generation module and a second service module. The names of these modules do not constitute limitations to the modules themselves in some cases, for example, the random number generation module may also be described as "a module for generating a second random number".

In another aspect, the present disclosure further provides a computer-readable medium, wherein the computer-readable medium may be contained in the device described in the foregoing embodiments; and the computer-readable medium may also exist alone, and is not assembled in the device. The computer-readable medium carries one or more programs, and when the one or more programs are executed by one device, the device includes:

locally generating, by a first node in a blockchain, a first random number and a first digest value of the first random number; submitting, by the first node, the first digest value to a smart contract; broadcasting, by the smart contract, a first service, so that at least one blockchain node in the blockchain submits participation information about the first service; the smart contract determining a second node from the at least one blockchain node based on the order of submission of participation information by the at least one blockchain node; when the first service ends, submitting, by the first node, the first random number to the smart contract; when the smart contract verifies that the first random number corresponds to the first digest value, generating a second random number based on a second digest value of the second node and the first random number; and starting a second service based on the second random number;

or, locally generating, by at least one blockchain node, a first random number and a first digest value of the first random number; respectively submitting, by the at least one blockchain node, the first digest value to a smart contract of the blockchain within a first preset duration; submitting, by the at least one blockchain node, the first random number to the smart contract within a second preset duration that is started after the first preset duration ends; verifying, by the smart contract, the received at least one first digest value and the first random number corresponding to the first digest value; generating a second random number based on the successfully verified first random number; and starting a service based on the second random number.

In the technical solutions according to the embodiments of the present disclosure, the first node in the blockchain is used to locally generate the first random number and the first digest value of the first random number, and then the first digest value is submitted to the smart contract. After the smart contract broadcasts the first service, each blockchain node may participate in the first service by submitting the participation information, and then the smart contract may determine the second node based on the order of the blockchain nodes submitting the participation information, and generate the second random number by combining the second digest value of the second node with the first random number that is submitted by the first node after the first service ends. Since the order of the blockchain nodes participating in the first service cannot be predetermined, that is, the order of the blockchain nodes participating in the first service is random, and then cheating cannot be performed during the process of determining the second node based on the order of the blockchain nodes submitting the participation information, thereby ensuring the randomness of the second node. Moreover, the first digest value submitted by the first node to the smart contract may be notified to each blockchain node in the blockchain, and the smart contract further verifies the first digest value and the first random number, so that cheating cannot be performed on the first digest value submitted by the first node and the first random number submitted after the first service ends. Therefore, cheating cannot be performed during the process when the smart contract generates the second random number based on the second digest value of the second node and the first random number submitted by the first node, that is, cheating cannot be performed during the generation process of the second random number, thereby improving the credibility of the generated random number. Further, the second service is started based on the generated trusted random number, so that the randomness of the result of the second service can be ensured, and the possibility of cheating caused by human intervention is avoided, thereby ensuring the fairness of the service result.

Moreover, each blockchain node in the blockchain locally generates the first random number and the first digest value of the first random number, and then respectively submits the first digest value and the first random number to the smart contract in two stages (the first preset duration and the second preset duration), the smart contract verifies the received first digest value and the corresponding first random number, and generates the second random number based on the successfully verified first random number. Therefore, by means of respectively submitting the first digest value and the first random number to the smart contract in two stages, and verifying the first digest value and the first random number by the smart contract, the possibility of cheating in a random number generation process is avoided, thereby improving the credibility of the random numbers. Furthermore, the service is started based on the generated trusted random number, so that the randomness of the service result can be ensured, the possibility of cheating caused by human intervention is avoided, thereby ensuring the fairness of the service result.

The foregoing specific embodiments do not constitute limitations to the protection scope of the present disclosure. It should be understood by those skilled in the art that, a wide variety of modifications, combinations, sub-combinations and substitutions may occur depending on design requirements and other factors. Any modifications, equivalent replacements, improvements and the like, made within the spirit and principles of the present disclosure, should be included within the protection scope of the present disclosure.

What is claimed is:

1. A method for generating a random number in a blockchain, comprising:
   locally generating, by a first node in the blockchain, a first random number and a first digest value of the first random number;
   submitting, by the first node, the first digest value to a smart contract;
   broadcasting, by the smart contract, a first service, so that at least one blockchain node in the blockchain submits participation information about the first service;
   determining, by the smart contract, a second node from the at least one blockchain node based on an order of submission of participation information by the at least one blockchain node;
   when the first service ends, submitting, by the first node, the first random number to the smart contract;
   when the smart contract verifies that the first random number corresponds to the first digest value, generating a second random number based on a second digest value of the second node and the first random number; and
   starting a second service based on the second random number.

2. The method as claimed in claim 1, wherein determining the second node from the at least one blockchain node comprises:
   determining the second node based on a preset target value and the order of submission of participation information by the at least one blockchain node, wherein the preset target value is a last one in the order.

3. The method as claimed in claim 1, wherein, generating, by the smart contract, a third digest value based on the first random number, wherein an algorithm for generating the first digest value is the same as an algorithm for generating the third digest value; and
   when the third digest value is the same as the first digest value, determining that the first random number corresponds to the first digest value.

4. The method as claimed in claim 1, wherein,
   a blockchain node corresponding to a provider of the first service is taken as the first node.

5. The method as claimed in claim 1, wherein after generating the second random number, the method further comprises:
   the smart contract sending a virtual resource to the first node.

6. The method as claimed in claim 1, wherein starting the second service based on the second random number comprises:
   receiving options submitted by the at least one blockchain node respectively; and
   starting a selection service to determine, based on the second random number, a target option from the options submitted by the at least one blockchain node respectively.

7. The method as claimed in claim 6, further comprising:
   sending a virtual resource to a blockchain node that submits the target option.

8. A method for generating a random number in a blockchain, comprising:
   locally generating, by at least one blockchain node, a first random number and a first digest value of the first random number;
   respectively submitting, by the at least one blockchain node, the first digest value to a smart contract of the blockchain within a first preset duration;
   submitting, by the at least one blockchain node, the first random number to the smart contract within a second preset duration that is started after the first preset duration ends;
   verifying, by the smart contract, the received at least one first digest value and the first random number corresponding to the first digest value;
   generating a second random number based on a successfully verified first random number; and
   starting a service based on the second random number;
   wherein generating the second random number based on the successfully verified first random number comprises: determining, by the smart contract, from the at least one blockchain node, a blockchain node that submits the first random number at last; and calculating, according to a preset operation rule, a digest value of the blockchain node that submits the first random number at last, and the successfully verified first random number, so as to generate the second random number.

9. The method as claimed in claim 8, wherein,
   when it is determined that the number of the successfully verified first random number is not less than a preset number threshold value, generating, by the smart contract, the second random number based on the successfully verified first random number.

10. The method as claimed in claim 9, wherein the preset number threshold value is determined based on the number of the at least one blockchain node.

11. The method as claimed in claim 8, wherein,
   verifying, by the smart contract, the first random number and the corresponding first digest value, if within the second preset duration, every time upon receiving one first random number, the smart contract determines the first digest value corresponding to the first random number has been received, and the first digest value is received within the first preset duration;

if verifying successfully, progressively increasing the number of the successfully verified first random number; and if verifying unsuccessfully, sending prompt information by the smart contract, so that the blockchain node submitting the first random number resubmits the first random number within the second preset duration according to the prompt information.

12. The method as claimed in claim 8, wherein verifying, by the smart contract, the received at least one first digest value and the first random number corresponding to the first digest value, comprises:

for each pair of the first digest value and the first random number, generating, by the smart contract, a second digest value based on the first random number, wherein an algorithm for generating the first digest value is the same as an algorithm for generating the second digest value; and if the second digest value is the same as the first digest value, determining that the first digest value and the corresponding first random number are successfully verified.

13. The method as claimed in claim 8, further comprising:

determining, by the smart contract, a blockchain node corresponding to the successfully verified first random number, and sending a virtual resource to the determined blockchain node.

14. The method as claimed in claim 8, wherein starting the service based on the second random number comprises:

receiving options submitted by the at least one blockchain node respectively; and starting a selection service to determine, based on the second random number, a target option from the options submitted by the at least one blockchain node respectively.

15. The method as claimed in claim 14, further comprising:

sending a virtual resource to a blockchain node that submits the target option.

16. An electronic device for generating a random number in a blockchain, comprising:

one or more processors; and a storage apparatus, configured to store one or more programs, wherein, when the one or more programs are executed by the one or more processors, the one or more processors implement following actions:

locally generating, by a first node in the blockchain, a first random number and a first digest value of the first random number;

submitting, by the first node, the first digest value to a smart contract;

broadcasting, by the smart contract, a first service, so that at least one blockchain node in the blockchain submits participation information about the first service;

determining, by smart contract, a second node from the at least one blockchain node based on the order of submission of participation information by the at least one blockchain node;

when the first service ends, submitting, by the first node, the first random number to the smart contract;

when the smart contract verifies that the first random number corresponds to the first digest value, generating a second random number based on a second digest value of the second node and the first random number; and starting a second service based on the second random number.

17. A non-transitory computer-readable storage medium, on which a computer program is stored, wherein when executed by a processor, the program implements following actions:

locally generating, by a first node in the blockchain, a first random number and a first digest value of the first random number;

submitting, by the first node, the first digest value to a smart contract;

broadcasting, by the smart contract, a first service, so that at least one blockchain node in the blockchain submits participation information about the first service;

determining, by smart contract, a second node from the at least one blockchain node based on the order of submission of participation information by the at least one blockchain node;

when the first service ends, submitting, by the first node, the first random number to the smart contract;

when the smart contract verifies that the first random number corresponds to the first digest value, generating a second random number based on a second digest value of the second node and the first random number; and starting a second service based on the second random number.

18. An electronic device for generating a random number in a blockchain, comprising:

one or more processors; and a storage apparatus, configured to store one or more programs, wherein, when the one or more programs are executed by the one or more processors, the one or more processors implement following actions:

at least one blockchain node locally generating a first random number and a first digest value of the first random number;

the at least one blockchain node respectively submitting the first digest value to a smart contract of the blockchain within a first preset duration;

the at least one blockchain node submitting the first random number to the smart contract within a second preset duration that is started after the first preset duration ends;

the smart contract verifying the received at least one first digest value and the first random number corresponding to the first digest value;

generating a second random number based on a successfully verified first random number; and starting a service based on the second random number;

wherein generating the second random number based on the successfully verified first random number comprises: determining, by the smart contract, from the at least one blockchain node, a blockchain node that submits the first random number at last; and calculating, according to a preset operation rule, a digest value of the blockchain node that submits the first random number at last, and the successfully verified first random number, so as to generate the second random number.

19. A non-transitory computer-readable storage medium, on which a computer program is stored, wherein when executed by a processor, the program implements following actions:

at least one blockchain node locally generating a first random number and a first digest value of the first random number;

the at least one blockchain node respectively submitting the first digest value to a smart contract of the blockchain within a first preset duration;

the at least one blockchain node submitting the first random number to the smart contract within a second preset duration that is started after the first preset duration ends;

the smart contract verifying the received at least one first digest value and the first random number corresponding to the first digest value;

generating a second random number based on a successfully verified first random number; and starting a service based on the second random number;

wherein generating the second random number based on the successfully verified first random number comprises: determining, by the smart contract, from the at least one blockchain node, a blockchain node that submits the first random number at last; and calculating, according to a preset operation rule, a digest value of the blockchain node that submits the first random number at last, and the successfully verified first random number, so as to generate the second random number.

* * * * *